United States Patent
Pillekamp et al.

(10) Patent No.: US 6,535,731 B1
(45) Date of Patent: Mar. 18, 2003

(54) UNIVERSAL MOBILE TELECOMMUNICATIONS SYSTEM

(75) Inventors: Klaus-Dieter Pillekamp, Erkrath (DE); Manfred Tasto, Bocholt (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 08/592,427

(22) PCT Filed: Aug. 5, 1994

(86) PCT No.: PCT/DE94/00910

§ 371 (c)(1),
(2), (4) Date: Feb. 5, 1996

(87) PCT Pub. No.: WO95/05040

PCT Pub. Date: Feb. 16, 1995

(30) Foreign Application Priority Data

Aug. 6, 1993 (DE) .......................................... 43 26 523

(51) Int. Cl.[7] .................................................. H04Q 7/20
(52) U.S. Cl. ...................................................... 455/422
(58) Field of Search .............................. 455/426, 422, 455/427, 449, 444, 12.1, 13.1, 465, 448, 443, 445, 417

(56) References Cited

U.S. PATENT DOCUMENTS

| | | | |
|---|---|---|---|
| 4,259,549 A | * | 3/1981 | Stehman |
| 4,549,293 A | | 10/1985 | Christian et al. |
| 4,748,655 A | | 5/1988 | Thrower et al. |
| 4,759,051 A | | 7/1988 | Han |
| 4,797,947 A | * | 1/1989 | Labedz |
| 5,058,201 A | * | 10/1991 | Ishii et al. |
| 5,117,503 A | * | 5/1992 | Olson |
| 5,161,252 A | * | 11/1992 | Higuchi et al. |
| 5,287,541 A | | 2/1994 | Davis et al. |
| 5,327,572 A | * | 7/1994 | Freeburg |
| 5,345,594 A | * | 9/1994 | Tsuda |
| 5,408,679 A | * | 4/1995 | Masuda |
| 5,410,728 A | * | 4/1995 | Bertiger et al. |
| 5,557,320 A | * | 9/1996 | Krebs |
| 5,594,737 A | * | 1/1997 | Pillekamp |
| 5,625,877 A | * | 4/1997 | Dunn et al. |

FOREIGN PATENT DOCUMENTS

| | | |
|---|---|---|
| DE | 295460 A5 | 10/1991 |
| EP | 0415810 A1 | 3/1991 |
| EP | 0418096 | 3/1991 |
| EP | 0418103 A2 | 3/1991 |
| EP | 0523687 A2 | 1/1993 |
| GB | 2234649 | 2/1991 |

OTHER PUBLICATIONS

Stanley Chia, The Universal Mobile Telecommunications System, IEEE Communications Magazine, p. 54–62, Dec. 12, 1992.*

IEEE Communications Magazine, vol. 30, No. 12, Dec. 1992, New York, "The Universal Mobile Telecommunication System", Stanley Chia, pp. 54–62.

Communication and Transmission, vol. 15, (1993) Special Issue, Paris, FR., "Perspectives for Mobile Communications", A. Charbonnier et al, pp. 109–121.

(List continued on next page.)

*Primary Examiner*—William Cumming
(74) *Attorney, Agent, or Firm*—Bell, Boyd & Lloyd LLC

(57) ABSTRACT

For the expansion of a cordless telecommunications system, in particular a DECT cordless telecommunications system, with respect to great transmission ranges in cordless telecommunications there is provided in a cordless telecommunications system (PIZSL-TKS) a relay station (RS) which is assigned at least one cordless mobile station (PIZ-MS). In the case of cordless telecommunications, the relay station (RS) replaces a cordless base station (PIZ-BS) and, in the case of the expanded cordless telecommunications, it is designed as a cordless mobile station (MIZ-MS, MAZ-MS, HYZ-MS).

16 Claims, 8 Drawing Sheets

OTHER PUBLICATIONS

Telcom Report 15, (Mar./Apr. 1992), "Mobilität und Kommunikation", Heinrich Armbrüster, pp. 57–63.

Telcom Report 08, (Feb. 1985), Sonderheft—Diensteintegrierendes Digitalnetz ISDN, pp. 2–72.

Telcom Report 14, (Sep./Oct. 1991), Sonderheft—(Special)—Vision O–N–E—Optimierte Netz–Evolution, Hans–Eugen Binder et al, Siemens AG, pp. 12–19.

Telcom Report 14, (1991), Grundsteine für schnelleren B–ISDN–Aufbau, Viktor Frantzen et al, Siemens AG, pp. 36–39; "Breitband–ISDN ante portas", Viktor Frantzen et al, Siemens AG, pp. 40–43; and "Schrittmacher für bitratenvariable Breitband–kommunikation", Oswald Fundneider, Siemens AG, pp. 258–261.

* cited by examiner

UNIVERSAL MOBILE TELECOMMUNICATIONS SYSTEM

BACKGROUND OF THE INVENTION

The invention relates to a universal mobile telecommunications system having an expanded cordless telecommunication system.

Modern mobile communications, for example mobile telecommunications for the transmission of voice, data, text, graphics, fixed and moving images, is divided up into a private sector and public sector in analogy with stationary communications (for example ISDN communications system; Integrated Services Digital Network). In addition, in the case of mobile telecommunications (first and second generation), a distinction is made between cellular telecommunications and cordless telecommunications. Cordless telecommunications has until now been based substantially on cordless telecommunications systems for home and office applications, while cellular telecommunications is dominated by the use of mobile radio telecommunications systems.

For the mobile telecommunications systems mentioned above, in particular those of the second generation, in most cases a TDMA method (Time Division Multiple Access) is used for the accessing and multiplexing of the signals to be transmitted. For future mobile telecommunications systems (for example third generation), however, the CDMA transmission method (Code Division Multiple Access) will also gain in significance, not least because of the likely use of cell-oriented transmission methods (ATM method; Asynchronous Transfer Mode). The reason for this is that, for an ever increasing number of communications and information services on offer and at the same time increasing requirements demanded in terms of the quality and quantity of the bit rates for transmission, an ever greater role will be played not only by the accessing and multiplexing methods but also by the optimized signal coding, channel coding for a flexible air interface.

The TDMA and CDMA transmission methods ultimately form the basis for the various system standards in mobile telecommunications. With regard to the TDMA method, the cordless telecommunications systems currently introduced on the market are set up in accordance with, inter alia, the digital pan-European DECT standard (Digital European Cordless Telecommunication) and the digital CT2 standard (Cordless Telephone 2), while the mobile radio telecommunications systems are set up in accordance with the worldwide GSM standard (Groupe Spéciale Mobile; Global System for Mobile Communications).

The further development of mobile communications in a spiral of effects according to FIG. 1 (Telcom Report 15; 1992; issue 2, pages 57 to 59) will lead to the already mentioned third generation of mobile telecommunications systems, in which the existing separation between cellular and cordless telecommunications is brought to an end. This third generation of mobile telecommunications is distinguished by universal mobility (in terms of time and location), in which each communications subscriber can be reached anywhere and at any time. With respect to this universal mobility, a distinction is drawn between equipment-related mobility via air connections and person-related mobility via air connections and cable connections. The inclusion of both aspects in universal mobile communications leads to "Advanced Mobility" with a universal mobile telecommunications system (UMTS=Universal Mobile Telecommunication System) in conjunction with universal personal telecommunications (UPT=Universal Personal Telecommunication). The universal mobile telecommunications system (UMTS) requires both flexible air interfaces and an intelligent network infrastructure. It is ensured by such a system structure that, on the one hand, mobile subscribers can communicate with one another at different speeds and traffic densities and, on the other hand, a large number of telecommunications and message services (information services) can be offered with high quality and capacity.

In FIG. 2 there is represented on the basis of the publication Telcom Report 15; 1992; issue 2, pages 60 to 63 a "Universal Mobile Communications—Advanced Mobility" scenario with the various applications with respect to the cell radius. According to this, the set-up of the universal mobile telecommunications system (UMTS) is subdivided into different communications cells for the application areas (office, home, town and country). These cells may be linked to one another two-dimensionally (country, town) or three-dimensionally (buildings). According to the representation in FIG. 2, the various types of mobile telecommunications (cordless, radio and satellite telecommunications SL-TK, MF-TK, SF-TK) are represented separately or in a mixed form in dependence on the cell radius.

In its pure, separate form for office and home applications, cordless telecommunications SL-TK takes place in the picocell range. In this picocell range—with a picocell radius PIZR of up to 200 m (transmission range)—there is at least one picocell PIZ with a cordless telecommunications system SL-TKS. The cordless telecommunications system SL-TKS in this case comprises a picocell-individual base station PIZ-BS (cordless base station) and at least one picocell-individual mobile station PIZ-MS (cordless mobile station) assigned to the base station PIZ-BS. If—as above and in the following—terms with the ending "cell-individual(ly)" are used in conjunction with an object/an activity/a characteristic, the object/the activity/the characteristic which is dedicated to a cell (for example a picocell, microcell, macrocell and hypercell) or belongs to a cell is meant by this.

In its pure, separate form for town or country applications, mobile radio telecommunications MF-TK takes place in stationary property (for example buildings) and/or in dynamic, mobile property (for example a car, train, etc.) in the macrocell range. In this macrocell range—with a macrocell radius MAZR of, for example, up to 20 km (transmission range)—, which covers the picocell range with the picocell PIZ and a microcell range with at least one microcell MIZ, there is at least one macrocell MAZ with a mobile radio telecommunications system MF-TKS. This mobile radio telecommunications system MF-TKS in this case comprises a macrocell-individual base station MAZ-BS (mobile radio base station), which may be of a stationary or mobile set-up (for example a car, train), and at least one macrocell-individual mobile station MAZ-MS (mobile radio mobile station) assigned to the base station MAZ-BS.

As an addition to cordless and mobile radio telecommunications SL-TK, MF-TK, satellite telecommunications SF-TK takes place in a hypercell range. In this hypercell range—with a hypercell radius HYZR of several hundred kilometers (transmission range)—there is at least one hypercell HYZ with a satellite telecommunications system SF-TKS. This satellite telecommunications system SF-TKS in this case comprises a satellite SAT, for example positioned in geostationary earth orbit, of a hypercell-individual base station HYZ-BS, which may be of a stationary set-up as an earth station ES or a mobile set-up as a mobile earth station MES (for example in an airplane, ship, truck, etc.), and at least one hypercell-individual mobile station HY-ZMS assigned to the base station HYZ-BS.

In the case of the mixed form of the three types of mobile telecommunications mentioned above, there is used, for example, for the realization of the "advanced mobility" concept within the universal mobile telecommunications system (UMTS) a network infrastructure NIS (ISDN= Integrated Services Digital Network, B-ISDN=Broadband Integrated Services Digital Network).

This network infrastructure NIS is, for example, a narrowband or broadband ISDN communications system. In the publication Telcom Report 8; 1985; special issue with the title "Diensteintegrierendes Digitalnetz ISDN" [Integrated Services Digital Network ISDN]—entire document—there is described a narrowband ISDN communications system and in the publications Telcom Report 14; 1991; special issue with the title "Telcom '91"—pages 12 to 19 ("Vision ONE—Optimierte Netz-Evolution" [Vision ONE— Optimized network evolution])—and Telcom Report 14; 1991;—pages 36 to 39 ("Grundsteine für schnelleren B-ISDN-Aufbau" [Foundation stones for faster D-ISDN set-up]), pages 40 to 43 ("Breitband-ISDN ante portas" [Broadband ISDN ante portas]), pages 258 to 261 ("Schrittmacher für bitratenvariable Breitband-kommunikation" [Pacesetter for bit-rate-variable broadband communications])—there is described a broadband ISDN communications system.

This network infrastructure NIS is bidirectionally connected to the picocell-individual base stations PIZ-BS of the cordless telecommunications system SL-TKS, the macrocell-individual base stations MAZ-BS of the mobile radio telecommunications system MF-TKS and/or via the stationary earth station ES to the satellite SAT of the satellite telecommunications system SF-TKS.

However, to be able to install such a universal mobile telecommunications system UMTS, represented in FIG. 2 and described above, a series of problems still have to be solved.

This series of problems relates to
concepts for introduction (for example necessary technical compatibility or interaction with existing systems and networks with regard to area coverage, extent of use, possible communication and information services etc.);
a long-term concept with harmonized integration or complex "interworking" in a multi-system or multi-operator scenario;
possible substitutions (for example between line connections and air connections or between UPT and UMTS);
use of synergetic effects in development and production;
a possible delaying and influencing of the universal mobile telecommunications system (UMTS) by constant improvements in the systems of the second generation (advanced GSM, advanced DECT);
technical, legal, political, social uncertainties (for example interworking of distributed databases, future frequency assignment, possible health impairment caused by radio).

Given this large number of problems, an evolutionary further development of the universal mobile telecommunications system (UMTS) appears to be probable. In the course of this evolutionary further development, cellular interactive telecommunications (mobile radio) and cordless interactive telecommunications (cordless technology) are being advanced step by step up to universal mobile telecommunications (UMTS) with "advanced mobility".

If mention is made in the following of a universal mobile telecommunications system according to the representation in FIG. 2, this means, inter alia, a telecommunications system which
is based on different accessing, multiplexing, coding and modulation methods (TDMA and CDMA methods),
is based on the use of the cell-oriented transmission method (ATM=Asynchronous Transfer Mode) in the network infrastructure NIS,
can be used for different telecommunications standards (DECT, GSM, advanced DECT, advanced GSM) and
can be used for different communication and message/information services (for example voice dialog, information transmission in the form of data, text and image and also emergency call, locating and navigation services).

European references EP 0 418 096 A2 discloses a cellular mobile radio system (macrocell) which is subdivided into a plurality of subcells (picocells). Each of these subcells is assigned a duplex repeater station, by means of which a macrocell-individual radio connection can be set up between a macrocell-individual base station and a low-power mobile unit respectively assigned to the subcells. The duplex repeater station has in this case the task of receiving converting and amplifying radio signals transmitted from the low-power mobile units to the macrocell-individual base station and of receiving, converting and Attenuating radio signals transmitted from the macrocell-individual base station to the low-power mobile units (tasks of a transponder).

U.S. Pat. No. 4,748,655, which comes closest to the subject-matter of the application, discloses portable telephones which can be connected via a multiplicity of different network coupling devices (gateways), such as for example shared radio units, radio telephones, cordless telephones or private branch exchanges, to a cellular radio network. In addition, the portable telephone can also be used within the cellular radio network as a pager. The user of such a multifunctional telephone can consequently take part in network telecommunications without owning a radio telephone required for telecommunication in the cellular radio network. This participation is ensured in this case by the various gateways. Of the various gateways, the shared radio unit, designed as a multichannel arrangement, is particularly able to serve a multiplicity of the said multifunctional telephones within a limited area, smaller than the cells of the radio network. The shared radio unit, which is preferably transportably designed and used for example in public areas such as railroad stations, airports, trains or buses, serves for the said telecommunication purposes exclusively as a connection and conversion unit between a base station assigned to the cellular radio network and the multifunctional telephones. The operating principle of the shared radio unit consequently corresponds to a transponder, such as that known, for example, from satellite technology.

U.S. Pat. No. 4,759,051 discloses a cellular radio telephone system in which a geographical radio area with a cellular cell station is subdivided into a plurality of radio cells. Each of these radio cells contains a transponder, the transponder picking up, amplifying and emitting again the radio signals to be transmitted which are on the radio link between the portable radio units and the cell station.

In the IEEE Communications Magazine 30, December 1992, No. 12, pages 54 to 62, the conception and preconditions of a universal mobile telecommunications system (UMTS) for the third system generation of mobile telecommunications are discussed.

SUMMARY OF THE INVENTION

The object underlying the invention is to specify a universal mobile telecommunications system in which, in the course of further development of mobile telecommunications according to the spiral of effects shown in FIG. 1, a picocell-individual cordless telecommunications system can be expanded (universally) to communications cells with different cell radii.

In general terms the present invention is a universal mobile telecommunications system having an expanded cordless telecommunications system, which covers a picocell range with at least one picocell and a cell range of higher order than the picocell range, with at least one cell of a higher order than the picocell. The system has a picocell mobile station which is assigned to the picocell and be connected by telecommunications to a relay station contained in the picocell. The relay station is adapted such that it can be connected by telecommunications to a transmitting/receiving arrangement contained in the higher-order cell. The relay station is allocated not only the function of telecommunications connection to the transmitting/receiving arrangement assigned to the higher-order cell (for forming a cordless telecommunications system including the picocell mobile station and covering the picocell), but also the function of a picocell base station.

The major advantage of the universal mobile telecommunications system according to the invention is that a cordless telecommunications system expanded to communication cells with differing cell radii manages in the expanded cordless range with a lower transmitted power for cordless mobile stations and, as a result, the loading brought about by a user of the cordless mobile station by electromagnetic waves in cordless transmission is reduced. A further major advantage of the universal mobile telecommunications system according to the invention is that the possibility of higher-quality telephony, up to videotelephony, is provided by the expanded cordless telecommunications system, in particular in the picocell and microcell range. The reason for this is that, the smaller the cell radius of a communications cell, the greater generally the capacity available per unit area and consequently the usable bit rate for the respective application. The universal mobile telecommunications system according to the invention consequently already offers in the course of the spiral of effects for universal mobile telecommunications with advanced mobility a simple possibility for connecting cellular and cordless mobile telecommunications systems to each other. By this connection between the two mobile telecommunications systems and the development in parallel with this of a broadband ISDN communications system, there can consequently be set up a universal mobile telecommunications system in which a telecommunications subscriber can reach his communications partner anywhere (advanced mobility).

Advantageous developments of the present invention are as follows.

The relay station has at least one first transmitting/receiving antenna for the telecommunications connection to the transmitting/receiving arrangement assigned to the higher-order cell and at least one second transmitting/receiving antenna for the telecommunications connection to the picocell mobile station. In a further embodiment the first transmitting/receiving antenna is designed as a directional antenna.

Two second transmitting/receiving antennas are provided and are designed as diversity antennas.

A first transmitting/receiving arrangement is designed as a cordless base station assigned to a microcell.

A second transmitting/receiving arrangement is designed as a mobile radio base station assigned to a macrocell.

When the first transmitting/receiving arrangement is a cordless base station, the first transmitting/receiving arrangement is connected to a first switching system.

When the second transmitting/receiving arrangement is a mobile radio base station, the second transmitting/receiving arrangement is connected to a first switching system.

A third transmitting/receiving arrangement is designed as a second switching system with an air/line interface. In a further embodiment the first and/or second switching system is designed as a private branch exchange.

A fourth transmitting/receiving arrangement is designed as a satellite radio telecommunications system with a satellite, arranged in geostationary earth orbit, and an earth station.

The cordless telecommunications system and a first expanded cordless telecommunications system are set up as a DECT system.

The cordless telecommunications system is set up as a DECT system and a Second expanded cordless telecommunications system is set up as a cordless/mobile radio system.

The cordless telecommunications system and the expanded cordless telecommunications system are set up as a vidoetelephony system.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, in which:

DESCRIPTION OF THE PREFERRED EMBODIMENTS

Figure 1:
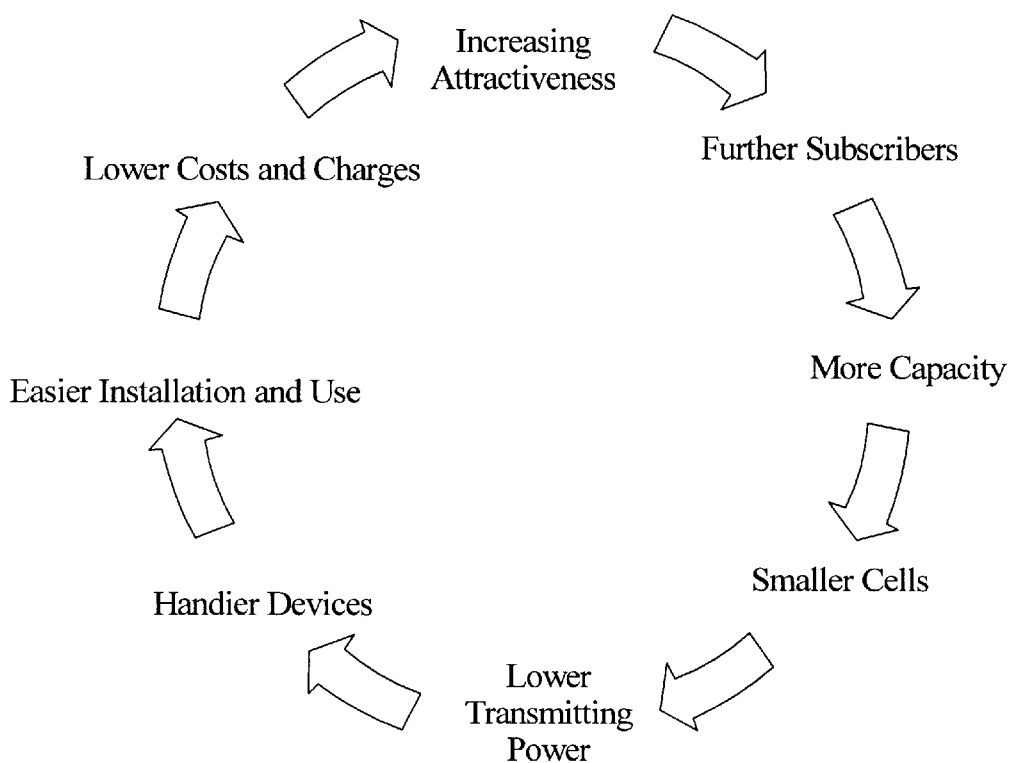
FIG. 1 depicts the effects of mobile communications development.
Figure 2:
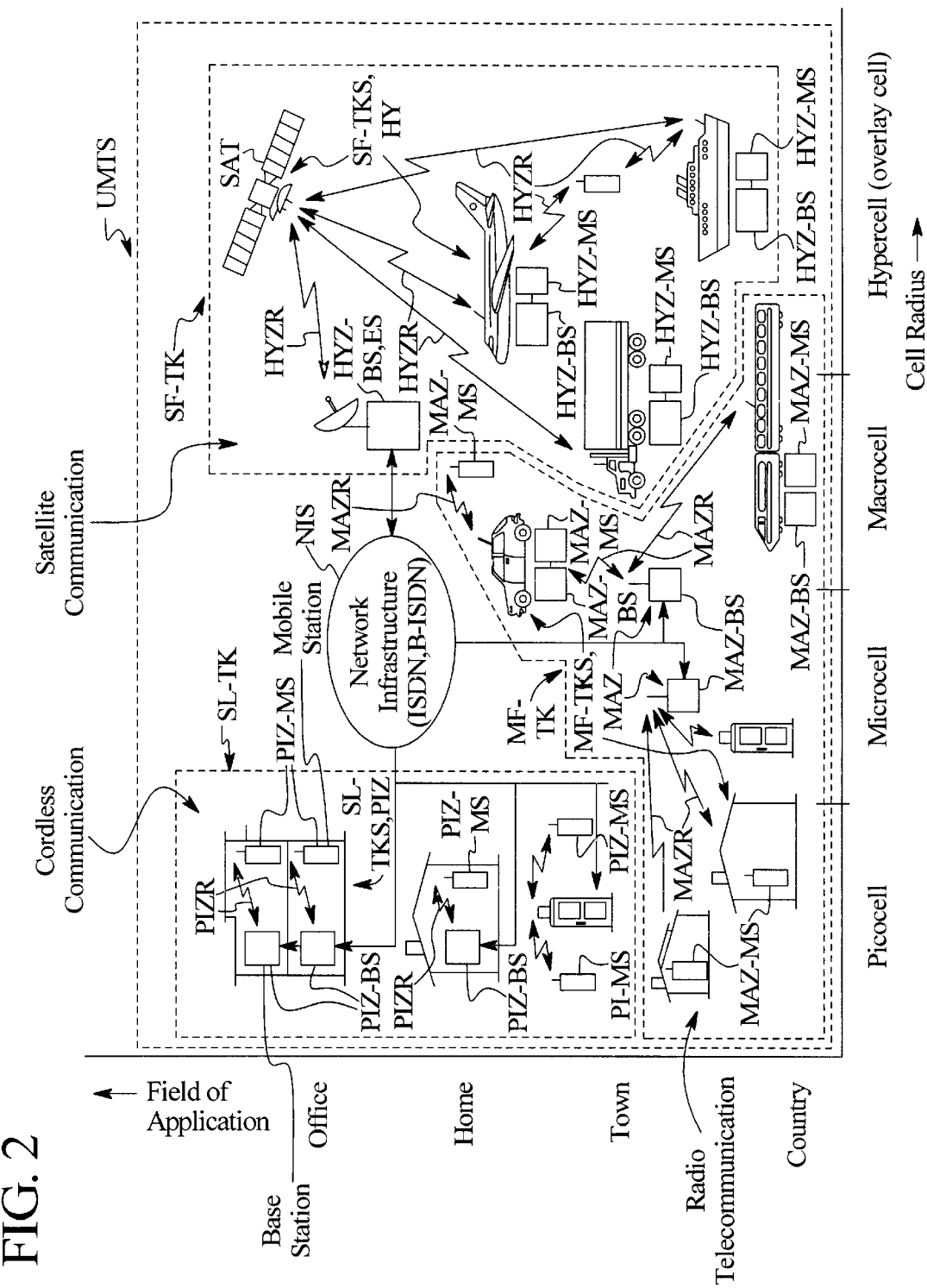
FIG. 2 depicts a universal mobile communications scenario with various applications with respect to cell radius.
Figure 3:
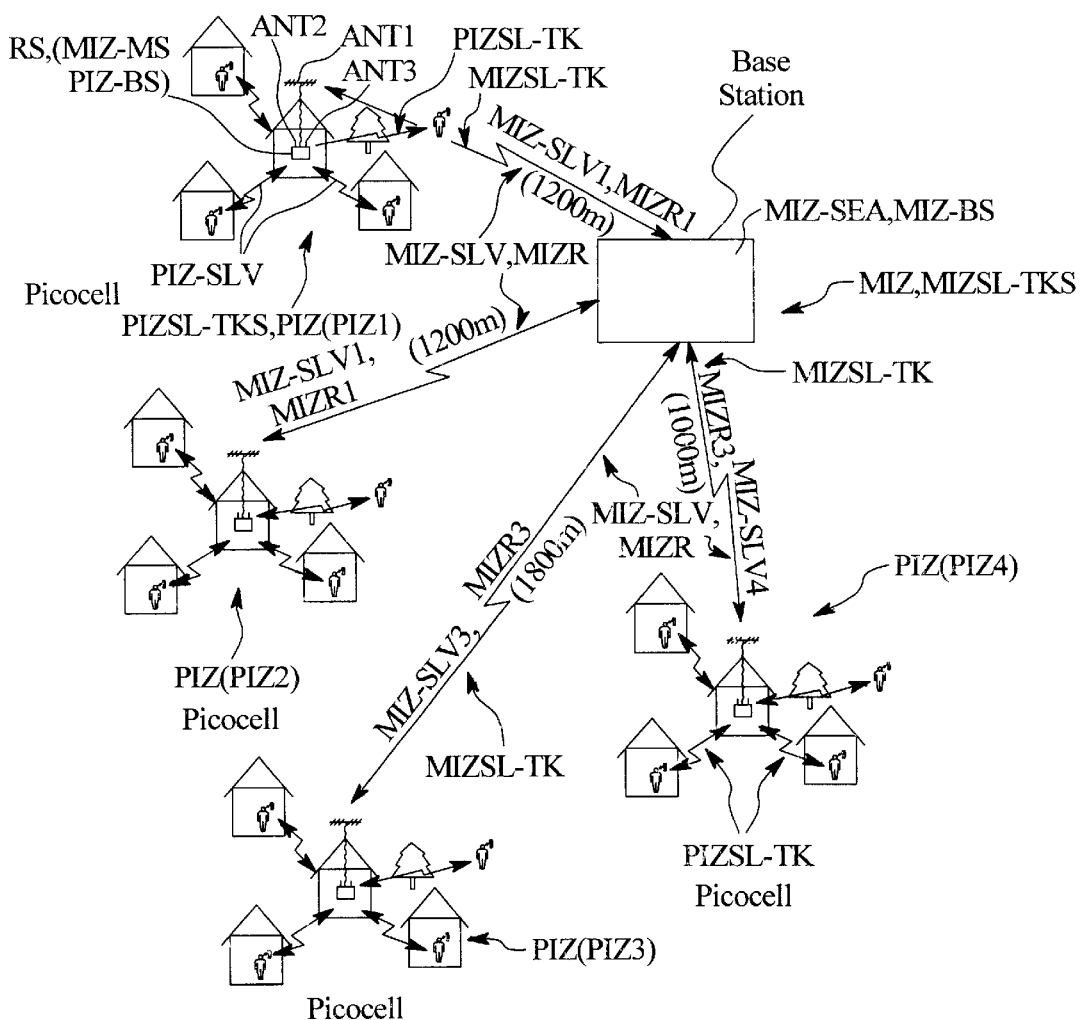
FIG. 3 shows a cordless telecommunications system expanded to the microcell range.

FIG. 3 shows a cordless telecommunications system MIZSL-TKS expanded to a microcell MIZ of the microcell range according to FIG. 2. The microcell MIZ is in this case a communications space in whose communications center—in the case of the microcell MIZ—a microcell-individual transmitting/receiving arrangement MIZ-SEA is arranged. Via this transmitting/receiving arrangement MIZ-SEA, all microcell-individual cordless telecommunications MIZSL-TK is handled. The transmitting/receiving arrangement MIZ-SEA is in this case designed, for example, as a microcell-individual base station MIZ-BS. For this expanded microcell-individual cordless telecommunications MIZSL-TK, the transmitting/receiving arrangement MIZ-SEA is assigned at least one picocell PIZ for picocell-individual cordless telecommunications SL-TK according to FIG. 2 via in each case a microcell-individual cordless connection MIZ-SLV. The number of picocells PIZ which are assigned to the transmitting/receiving arrangement MIZ-SEA via the corresponding number of cordless connections MIZ-SLV depends in particular on how large the communications subscriber density (traffic density) is in the microcell MIZ. In the case of thinly populated regions (microcells), the number of picocells PIZ tends to be small, while in the case of heavily populated regions (microcells) the number of picocells PIZ, with the associated microcell-individual cordless connections MIZ-SLV, is great. However, the number of picocells PIZ is not dependent only on the communications subscriber density, but is also governed by the transmission capacity available in the transmitting/receiving arrangement MIZ-SEA. This transmission capacity is in this case substantially determined by the number of transmission channels. For example, for picocell- or microcell-individual cordless telecommunications systems PIZSL-TKS, MIZSL-TKS set up in accordance with the DECT standard, there are currently a maxium of twelve transmission channels (half-duplex transmission channels) available.For a microcell-individual cordless telecommunications system MIZLS-TKS based on the DECT standard, this means that even with a large communications subscriber density there can theoretically be contained in the microcell MIZ only m, with m=12, picocells PIZ. The number m is theoretical because within each picocell PIZ there takes place in turn the picocell-individual cordless telecommunications PIZSL-TK. If this picocell-individual cordless telecommunications PIZSL-TK likewise takes place in accordance with the DECT standard, the number m with m=12 will be correspondingly reduced (as explained later in the description of the exemplary embodiment). In the microcell-individual cordless telecommunications system MIZSL-TKS represented in FIG. 3 there are, for example, m=4 picocells PIZ (PIZ1 . . . PIZ4) assigned to the transmitting/receiving arrangement PIZ-SEA via four microcell-individual cordless connections MIZ-SLV (MIZ-SLV1 . . . MIZ-SLV4). The maximum distance which these picocells PIZ1 . . . PIZ4 can be away from the transmitting/receiving arrangement MIZ-SEA is determined by the microcell radius MIZR which is assigned, by definition, to the microcell MIZ. This microcell radius MIZR is, for example, 2000 m. Thus, in FIG. 3 there are assigned to the transmitting/receiving arrangement MIZ-SEA the picocell. PIZ, via the microcell-individual cordless connection MIZ-SLV1 with a microcell radius MIZR1 of, for example, 1200 m, the picocell PIZ2, via the microcell-individual cordless connection MIZ-SLV2 with a microcell radius MIZR2 of, for example, likewise 1200 m, the picocell PIZ3, via the microcell-individual cordless connection MIZ-SLV3 with a microcell radius MIZR3 of, for example, 1800 m, and the picocell PIZ4, via the microcell-individual cordless connection MIZ-SLV4 with a microcell radius MIZR4 of, for example, 1000 m. Apart from the fact that they may be different distances away from the transmitting/receiving arrangement MIZ-SEA, the picocells PIZ1 . . . PIZ4 are otherwise structured identically with respect to picocell-individual cordless telecommunications PIZSL-TK. A relay station RS is arranged in each picocell PIZ for picocell-individual cordless telecommunications PIZSL-TK in the communications center of the picocell PIZ. The relay station RS has for microcell-individual cordless telecommunications MIZSL-TK and picocell-individual cordless telecommunications PIZSL-TK a plurality of antennas, a first antenna ANT1 for microcell-individual cordless telecommunications MIZSL-TK and, for example, two second antennas ANT2, ANT3 for picocell-individual cordless telecommunications PIZSL-TK. While the first antenna ANT1 for the larger transmission range in the case of microcell-individual cordless telecommunications MIZSL-TK is preferably designed as a directional antenna, the two second antennas ANT2, ANT3 for picocell-individual cordless telecommunications PIZSL-TK are preferably designed as diversity antennas. With respect to the two diversity antennas ANT2, ANT3, the relay station RS is designed in a way corresponding to the technical teaching disclosed in International Patent Application Wo 94/10764, published after the priority date. Via these diversity antennas ANT2, ANT3, the relay station RS is connected to at least one picocell-individual mobile station PIZ-MS. The connection is in this case established for each mobile station PIZ-MS via a picocell-individual cordless connection PIZ-SLV. In the expanded cordless telecommunications system MIZSL-TKS represented in FIG. 3, there are in each picocell PIZ respectively n=4 picocell-individual mobile stations PIZ-MS. The same conditions and prerequisites apply for the number n of mobile stations PIZ-MS in connection with the relay station RS handling picocell-individual cordless telecommunications PIZSL-TK as in the case of microcell-individual cordless telecommunications MIZSL-TK with the number m of picocells PIZ in connection with the transmitting/receiving arrangement MIZ-SEA handling microcell-individual cordless telecommunications MIZSL-TK. If, accordingly, the picocell-individual cordless telecommunications system PIZSL-TKS is set up like the microcell-individual cordless telecommunications system MIZSL-TKS in accordance with the DECT standard, it is true for the relay station RS that, with respect to the available transmission capacity (number of transmission channels), it can set up in total a maximum of m+n=12 picocell-individual cordless telecommunication connections to the surrounding mobile stations PIZ-MS and microcell-individual cordless telecommunications connections to the microcell-individual transmitting/receiving arrangement MIZ-SEA. The condition m+n=12 applying for the relay station RS follows from the fact that the relay station RS is designed for microcell-individual cordless telecommunications MIZSL-TK as a microcell-individual mobile station MIZ-MS and for picocell-individual cordless telecommunications PIZSL-TK as a picocell-individual base station PIZ-BS. In this case, for the design as a microcell-individual mobile station MIZ-MS in the case of microcell-individual cordless telecommunications MIZSL-TK, the relay station RS must be designed correspondingly (for example with respect to transmitted power, transmitting antenna etc.) to be able to transmit messages, information with the microcell radius MIZR of up to 2000 m.

Figure 5:
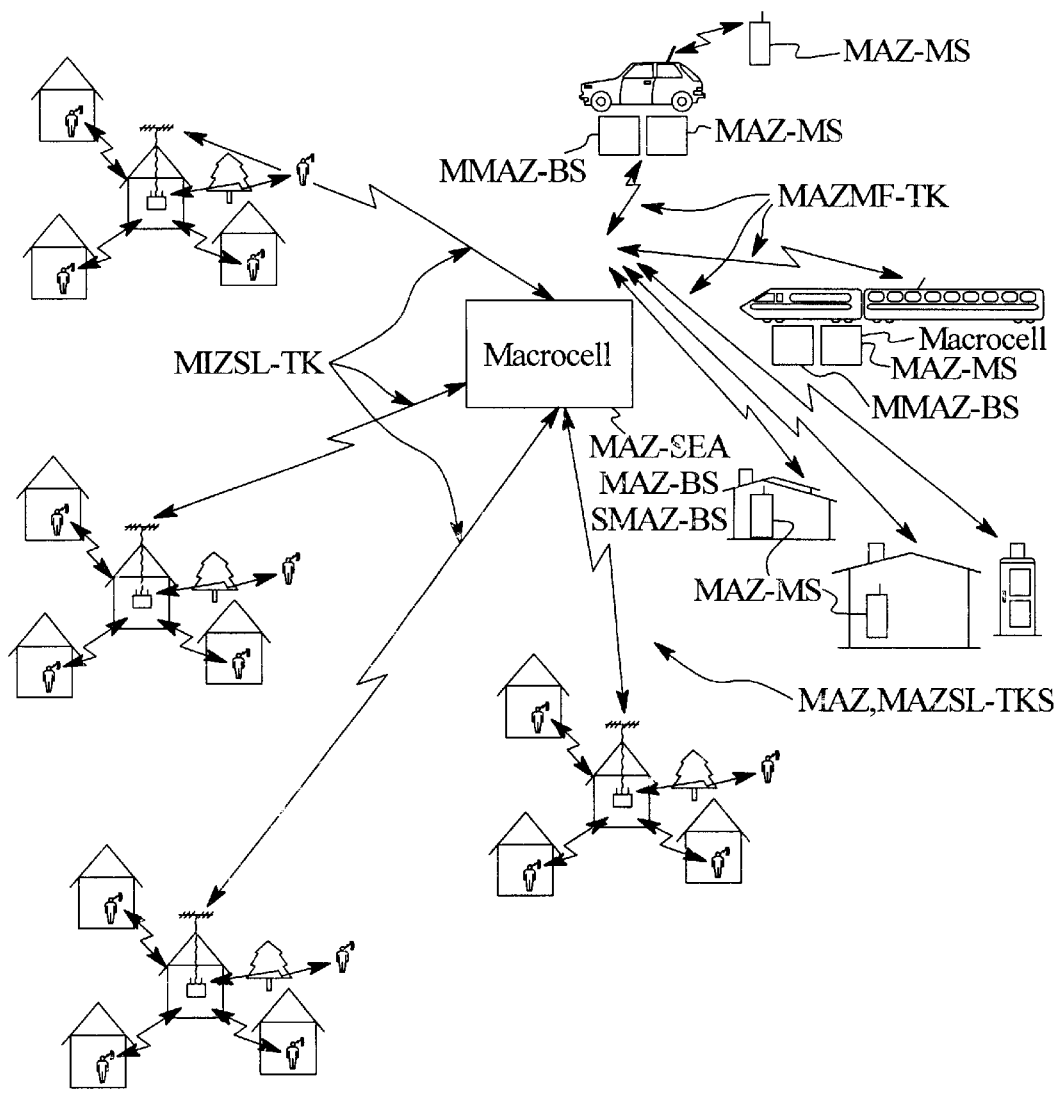
Figure 6:
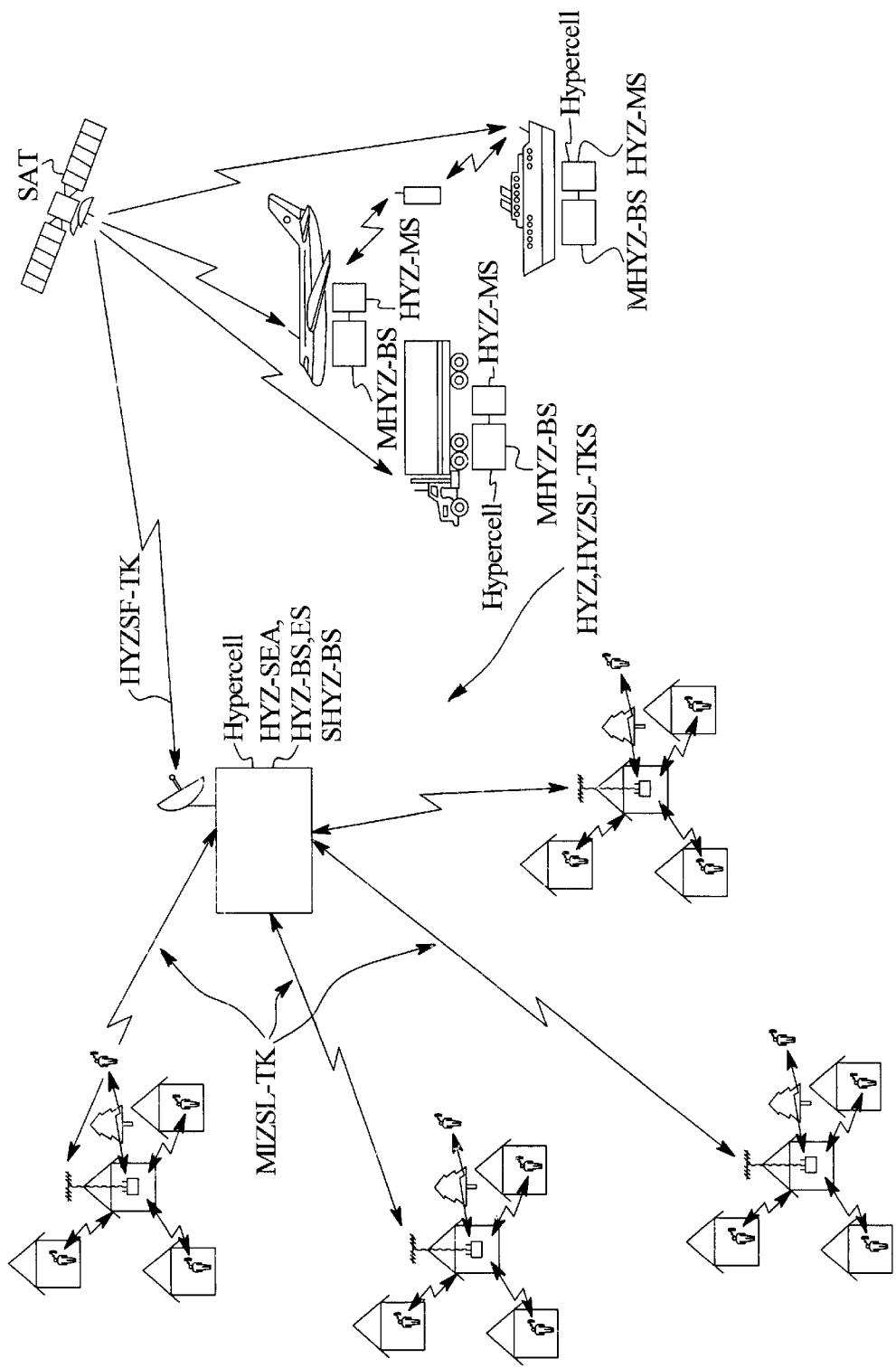
FIG. 6 shows a cordless telecommunications system expanded to the hypercell range.
Figure 7:
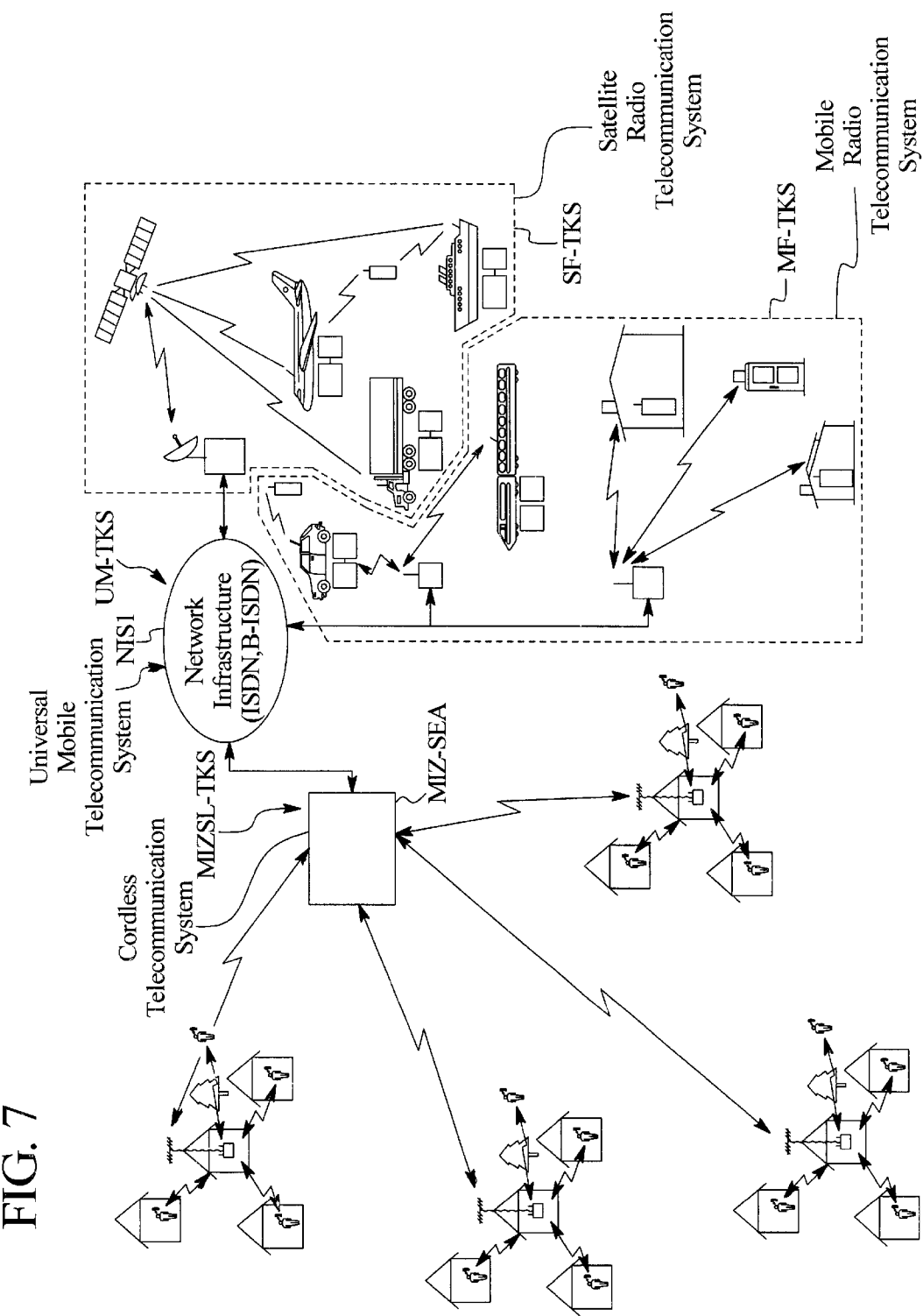
FIGS. 7 and 8 show a universal mobile telecommunications system.
Figure 8:
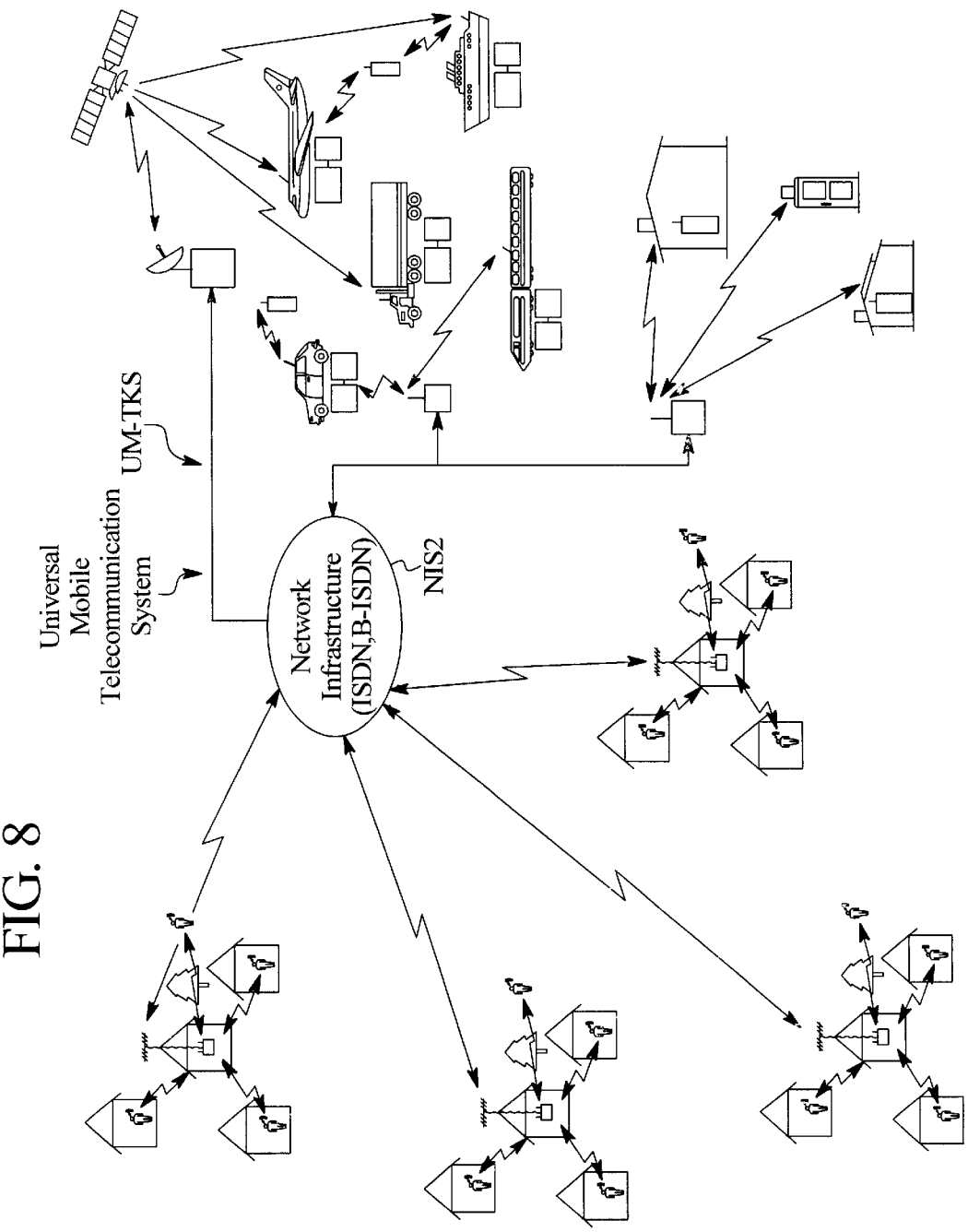

FIGS. 4 to 8 show on the basis of the microcell-individual cordless telecommunications system MIZSL-TKS represented in FIG. 3 a cordless telecommunications system expanded to at least one macrocell MAZ of the macrocell range according to FIG. 2 (FIGS. 4 and 5), to at least one hypercell HYZ of the hypercell range according to FIG. 2 (FIG. 6) and also two universally expandable cordless telecommunications systems (FIGS. 7 and 8).

Figure 4:
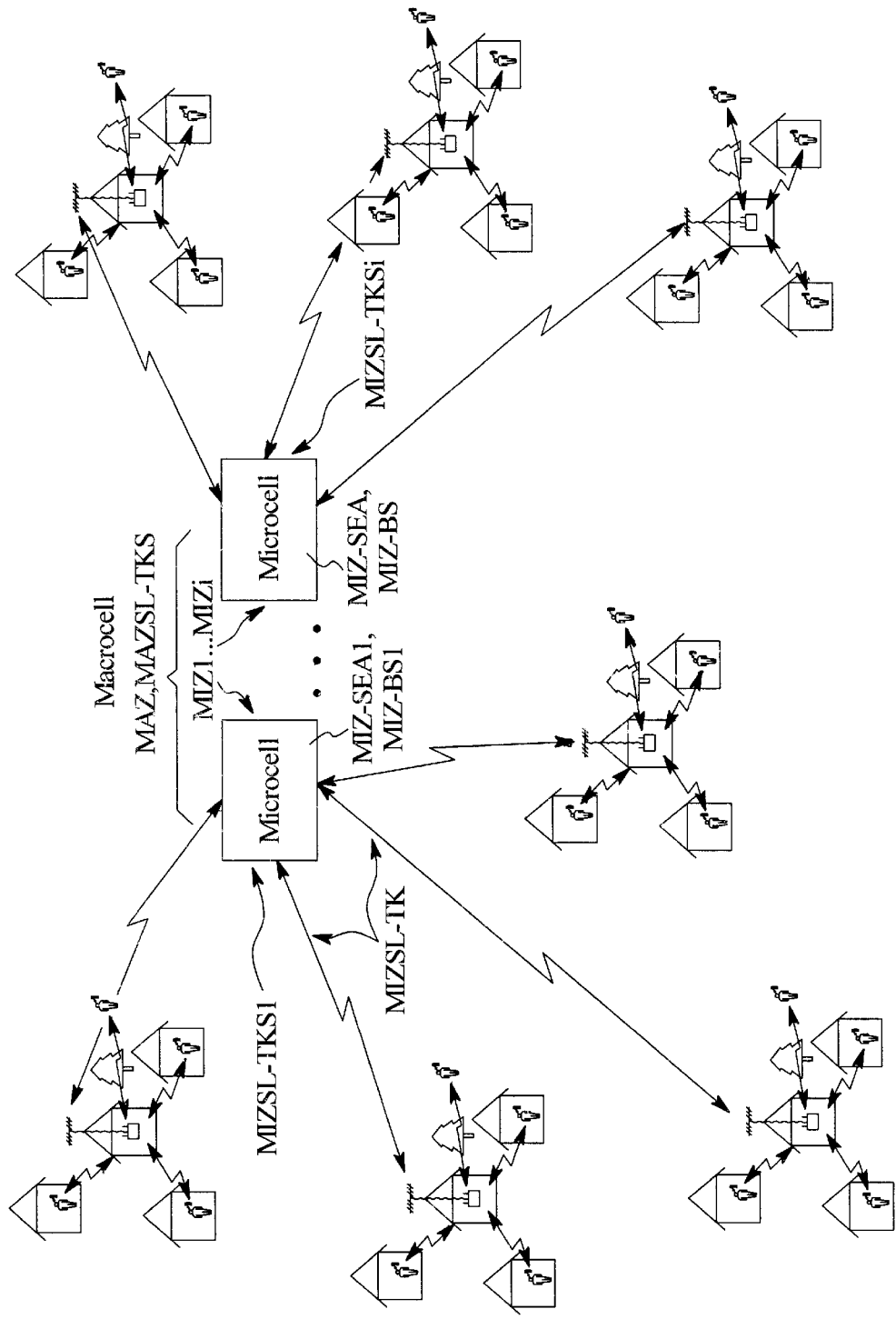
FIGS. 4 and 5 show a cordless telecommunications system expanded to the macrocell range.

Thus, in FIG. 4 there is represented a macrocell-individual cordless telecommunications system MAZSL-TKS, in which there is arranged within one macrocell MAZ of the macrocell range according to FIG. 2 with microcells MIZ1 ... MIZ1 a number i of microcell-individual cordless telecommunications systems MIZSL-TKS according to FIG. 3 for the realization of a "roaming and/or hand-over" function. Corresponding to the number i of microcell-individual cordless telecommunications systems MIZSL-TKS1 ... MIZSL-TKSi, there are in the macrocell MAZ a number i of microcell-individual transmitting/receiving arrangements MIZ-SEA1 ... MIZ-SEAi, which in turn are designed, for example, as microcell-individual base stations MIZ-BS1 ... MIZ-BSi and thereby handle in a way corresponding to the microcell-individual cordless telecommunications system MIZSL-TKS according to FIG. 3 the microcell-individual cordless telecommunications MIZSL-TK with the respective picocell PIZ. A first microcell-individual base station MIZ-BS1 is in this case assigned, for example, m=4 picocells PIZ with respectively a relay station RS and n=4 picocell-individual mobile stations PIZ-MS, while an ith microcell-individual base station MIZ-BSi is assigned, for example, m=3 picocells with respectively a relay station RS with n=4 picocell-individual mobile stations PIZ-MS.

In FIG. 5, as a modification of the macrocell-individual cordless telecommunications system MAZSL-TKS according to FIG. 4, there is instead of the microcell-individual cordless telecommunications systems MIZSL-TKS1 ... MIZSL-TKSi with the microcell-individual transmitting/receiving arrangements MIZ-SEA1 ... MIZ-SEAi at least one macrocell-individual transmitting/receiving arrangement MAZ-SEA responsible for expanded cordless telecommunications. This expanded cordless telecommunications may in this case comprise microcell-individual cordless telecommunications MIZSL-TK according to FIG. 3 or 4 and macrocell-individual mobile radio telecommunications MAZMF-TK (hybrid-cell-individual telecommunications according to FIG. 5) or else macrocell-individual cordless telecommunications MAZSL-TK and macrocell-individual mobile radio telecommunications MAZMF-TK (unitary-cell-individual telecommunications). In the case of this unitary-cell-individual telecommunications, the relay station RS according to FIG. 3 must be designed correspondingly for macrocell-individual cordless telecommunications MAZSL-TK (for example with respect to the transmitted power, transmitting antenna etc.) to be able to serve in macrocell-individual cordless telecommunications MAZSL-TK as a macrocell-individual mobile station MAZ-MS.

The macrocell-individual transmitting/receiving arrangement MAZ-SEA in this case takes over the function of a macrocell-individual base station MAZ-BS and is in this case preferably designed as a mobile radio base station. While the microcell-individual cordless telecommunications MIZSL-TK runs in the hybrid-cell-individual telecommunications in analogy with that in the microcell-individual cordless telecommunications system MIZSL-TKS according to FIGS. 3 and 4, the transmitting/receiving arrangement MAZ-SEA serves in the macrocell-individual mobile radio telecommunications MAZMF-TK (hybrid-cell- and unitary-cell-individual telecommunications) as a stationary macrocell-individual base station SMAZ-BS, which is connected via macrocell-individual mobile radio connections MAZ-MFV directly to macrocell-individual mobile stations MAZ-MS or indirectly via mobile macrocell-individual base stations MMAZ-BS to the mobile stations MAZ-MS.

In analogy with the representation in FIG. 4, in the macrocell-individual cordless telecommunications system MAZSL-TKS according to FIG. 5 there may in turn be provided a plurality of macrocells MAZ with respectively a macrocell-individual transmitting/receiving arrangement MAZ-SEA for the realization of the "roaming and/or hand-over" function.

In FIG. 6 there is represented a hypercell-individual cordless telecommunications system HYZSL-TKS, in which there is arranged in a hypercell HYZ of the hypercell range according to FIG. 2 a hypercell-individual transmitting/receiving arrangement HYZ-SA for expanded cordless telecommunications. This expanded cordless telecommunications may in this case comprise microcell-individual cordless telecommunications MIZSL-TK according to FIG. 3 or 4 and hypercell-individual satellite radio telecommunications HYZSF-TK (hybrid-cell-individual telecommunications according to FIG. 6) or else hypercell-individual cordless telecommunications HYZSL-TK and hypercell-individual satellite radio telecommunications HYZSF-TK (unitary-cell-individual telecommunications). In the case of this unitary-cell-individual telecommunications, the relay station RS must be designed correspondingly for hypercell-individual cordless telecommunications HYZSL-TK (for example with respect to the transmitted power, transmitting antenna etc.) for the transmission ranges in the hypercell range with the hypercell radius HYZR of several 100 km to be able to serve in hypercell-individual cordless telecommunications HYZSL-TK as a hypercell-individual mobile station HYZ-TKS.

The hypercell-individual transmitting/receiving arrangement HYZ-SEA in this case takes over for hybrid-cell- and unitary-cell-individual telecommunications the function of a hypercell-individual base station HYZ-BS and is thereby preferably designed as an earth station ES. While the microcell-individual cordless telecommunications MIZSL-TK runs in the hybrid-cell-individual telecommunications in analogy with that in the microcell-individual cordless telecommunications system MIZSL-TKS according to FIGS. 3 and 4, the transmitting/receiving arrangement HYZ-SEA serves in hypercell-individual satellite radio telecommunications HYZSF-TK (hybrid-cell- and unitary-cell-individual telecommunications) as a stationary hypercell-individual base station SHYZ-BS, which is connected via hypercell-individual satellite radio connections HYZ-SFV and a satellite SAT, arranged in geostationary earth orbit, indirectly via mobile hypercell-individual base stations MHYZ-BS to hypercell-individual mobile stations HYZ-MS.

In analogy with the representation in FIG. 4, in the hypercell-individual cordless telecommunications system HYZSL-TKS according to FIG. 6 there may in turn be provided a plurality of hypercells HYZ with respectively a hypercell-individual transmitting/receiving arrangement HYZ-SEA for the realization of the "roaming and/or hand-over" function.

FIG. 7 shows a universal mobile telecommunications system UM-TKS, in which the microcell-individual cordless telecommunications system MIZSL-TKS according to FIG. 3 is connected via a first network infrastructure NIS1 to the mobile radio telecommunications system MF-TKS and/or to the satellite radio telecommunications system SF-TKS according to FIG. 2. Consequently, an inter-cellular communications connection can be set up via the network infrastructure NIS1. In addition, the network infrastructure NIS1 offers the possibility of setting up communications connections to line-bound switching systems (EWSD, private branch exchanges) via an air/line interface. Moreover, there is the possibility of connecting to the network infrastructure NIS1 not only the microcell-individual cordless telecommunications system MIZSL-TKS according to FIG. 3 but also the other expanded cordless telecommunications systems according to FIGS. 4 to 6. In all the said embodiments of the universal mobile telecommunications system UM-TKS, an intercellular communications connection can always be set up via the network infrastructure NIS1.

FIG. 8 shows a modification of the universal mobile telecommunications system UM-TKS according to FIG. 7, which consists in that a second network infrastructure NIS2 is provided for the intercellular communications connection. This network infrastructure NIS2 differs from the first network infrastructure NIS1 according to FIG. 7 in that the microcell-individual transmitting/receiving arrangement MIZ-SEA is integrated in the network infrastructure. The network infrastructure NIS2 offers in addition the possibility of setting up communications connections to line-bound switching systems (EWSD, private branch exchanges) via an air/line interface. Moreover, there is the possibility of connecting to the network infrastructure NIS1 not only the microcell-individual cordless telecommunications system MIZSL-TKS according to FIG. 3 but also the other expanded cordless telecommunications systems according to FIGS. 4 to 6. In all the said embodiments of the universal mobile telecommunications system UM-TKS, an intercellular communications connection can always be set up via the network infrastructure NIS1.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A universal mobile telecommunications system, comprising:
    an expanded cordless telecommunications system, which covers a picocell range with at least one picocell and a cell range of higher order than the picocell range, with at least one cell of a higher order than the picocell;
    a picocell mobile station which is assigned to the picocell and connectable by telecommunications to a relay station contained in the picocell,
        the relay station being adapted such that the relay station is connectable by telecommunications to a transmitting/receiving arrangement contained in the higher-order cell;
    the relay station having allocated thereto function of telecommunications connection to the transmitting/receiving arrangement assigned to a higher-order cell for forming a cordless telecommunications system including the picocell mobile station and covering the picocell and the relay station also having a function of a picocell base station.

2. The universal mobile telecommunications system as claimed in claim 1, wherein the relay station has at least one first transmit-ting/receiving antenna for the telecommunications connection to the transmitting/receiving arrangement assigned to the higher-order cell and at least one second transmitting/receiving antenna for the telecommunications connection to the picocell mobile station.

3. The universal mobile telecommunications system as claimed in claim 2, wherein the first transmitting/receiving antenna is a directional antenna.

4. The universal mobile telecommunications system as claimed in claim 2, wherein the system has two second transmitting/receiving antennas, which are designed as diversity antennas.

5. The universal mobile telecommunications system as claimed in claim 1, wherein the higher-order cell is a macrocell and wherein the at least one first transmitting/receiving arrangement is a cordless base station assigned to a microcell.

6. The universal mobile telecommunications system as claimed in claim 1, wherein the higher-order cell is a macrocell and wherein the at least one second transmitting/receiving arrangement is a mobile radio base station assigned to a macrocell.

7. The universal mobile telecommunications system as claimed in claim 5, wherein the at least one first transmitting/receiving arrangement is connected to a first switching system.

8. The universal mobile telecommunications system as claimed in claim 6, wherein the at least one second transmitting/receiving arrangement is connected to a first switching system.

9. The universal mobile telecommunications system as claimed in claim 1, wherein the system further comprises a third transmitting/receiving arrangement that is a second switching system with an air/line interface.

10. The universal mobile telecommunications system as claimed in claim 7, wherein the switching system is a private branch exchange.

11. The universal mobile telecommunications system as claimed in claim 1, wherein the system further comprises a fourth transmitting/receiving arrangement that is a satellite radio telecommunications system with a satellite, arranged in geostationary earth orbit, and an earth station.

12. The universal mobile telecommunications system as claimed in claim 1, wherein the cordless telecommunications system and a first expanded cordless telecommunications system are set up as a DECT system.

13. The universal mobile telecommunications system as claimed in claim 1, wherein the cordless telecommunications system is set up as a DECT system and a second expanded cordless telecommunications system is set up as a cordless/mobile radio system.

14. The universal mobile telecommunications system as claimed in claim 1, wherein the cordless telecommunications system and an expanded cordless telecommunications system are set up as a videotelephony system.

15. The universal mobile telecommunications system as claimed in claim 8, wherein the switching system is a private branch exchange.

16. The universal mobile telecommunications system as claimed in claim 9, wherein the switching system is a private branch exchange.

* * * * *